Jan. 31, 1961  C. P. DE BIASI  2,969,987
MATERIAL SPREADER FOR USE ON A DUMP TRUCK
Filed July 16, 1957  4 Sheets-Sheet 1
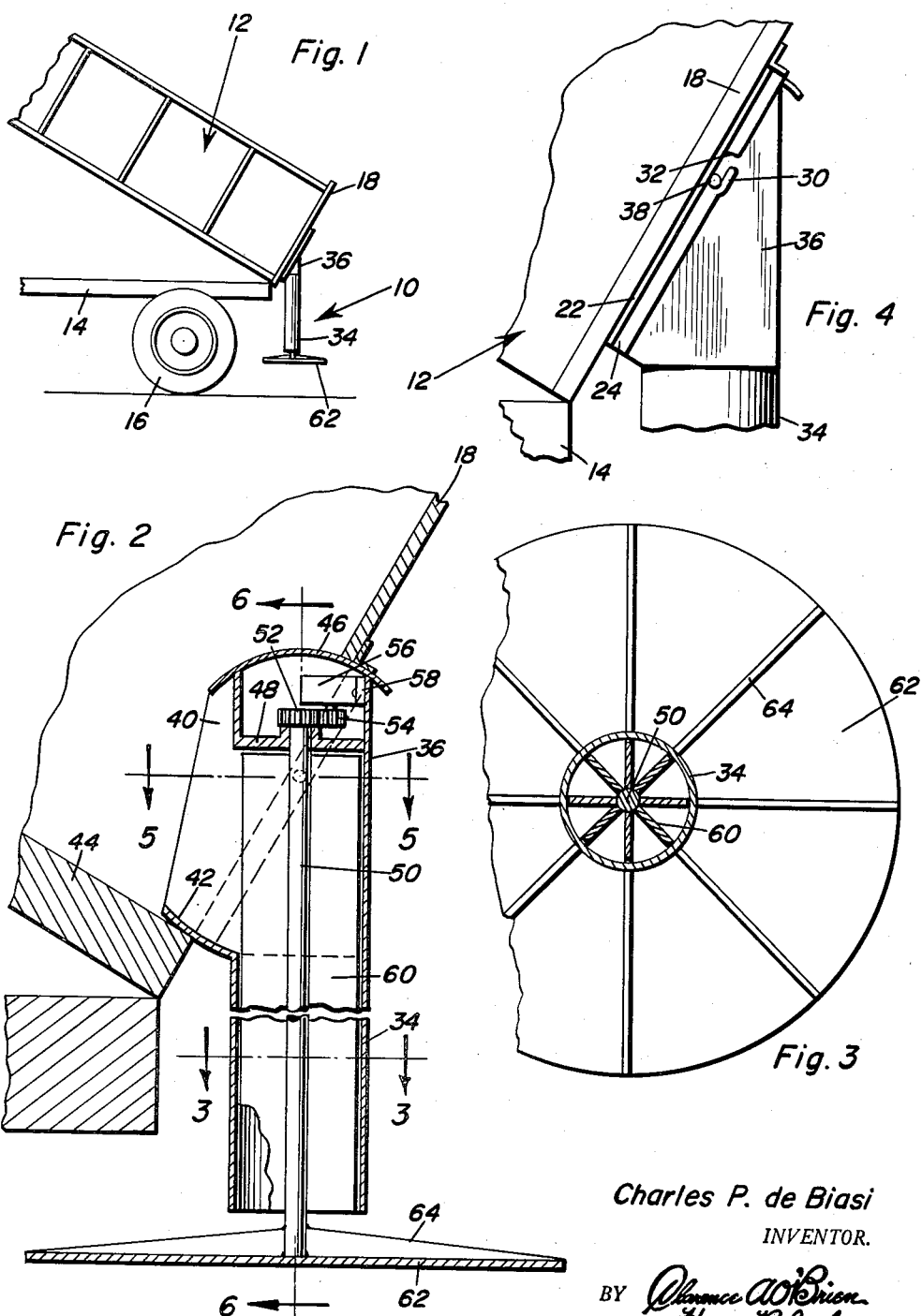
Charles P. de Biasi
INVENTOR.

Jan. 31, 1961 C. P. DE BIASI 2,969,987
MATERIAL SPREADER FOR USE ON A DUMP TRUCK
Filed July 16, 1957 4 Sheets-Sheet 2
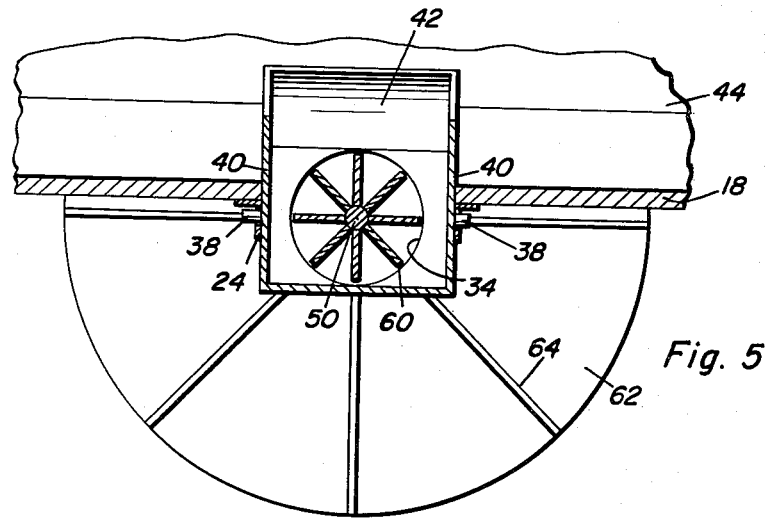
Fig. 5
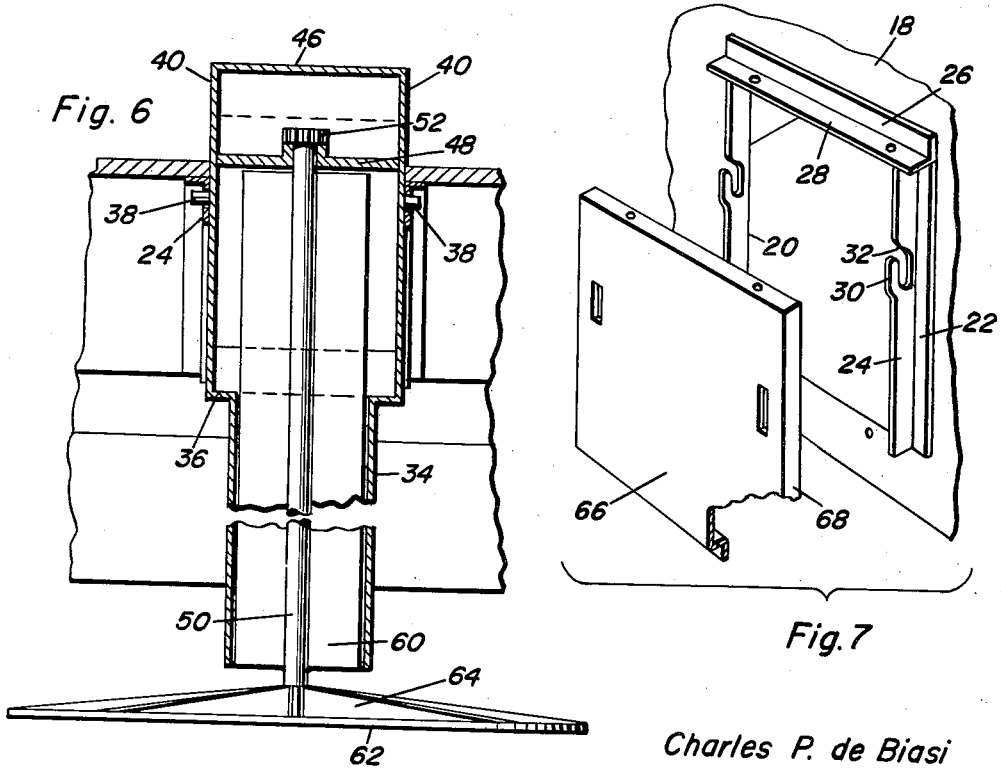
Fig. 6
Fig. 7
Charles P. de Biasi
INVENTOR.
BY *Clarence A. O'Brien*
*and Harvey B. Jacobson*
Attorneys

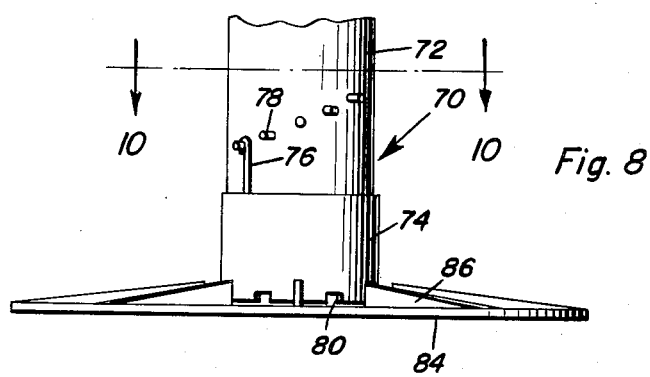
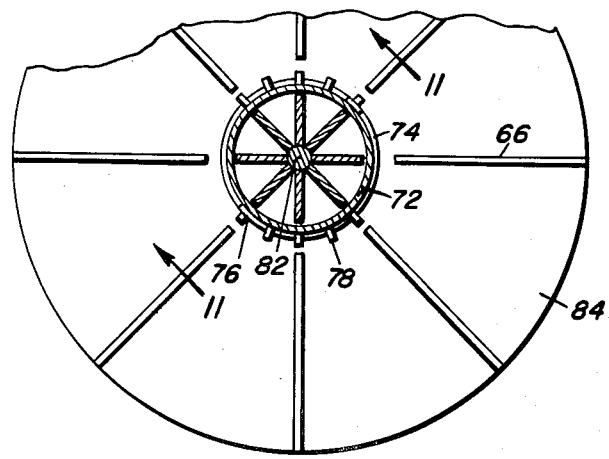
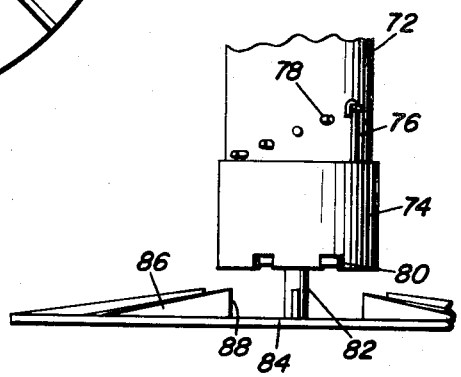
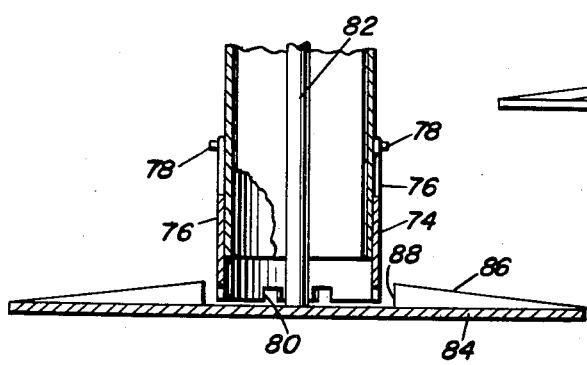

Jan. 31, 1961 C. P. DE BIASI 2,969,987
MATERIAL SPREADER FOR USE ON A DUMP TRUCK
Filed July 16, 1957 4 Sheets-Sheet 4
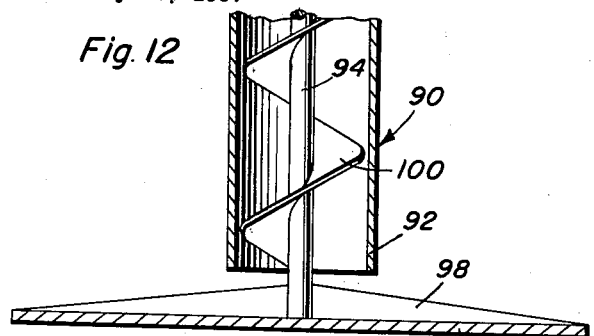
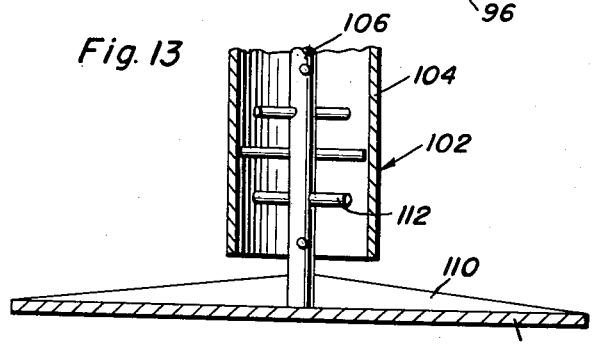
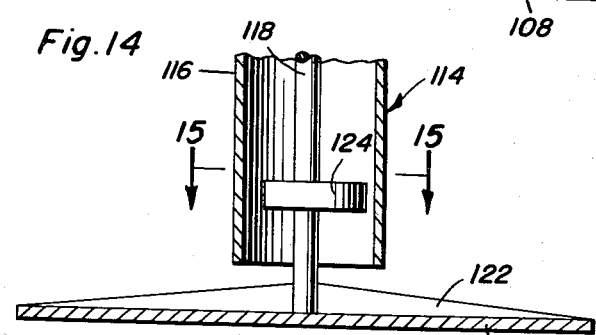
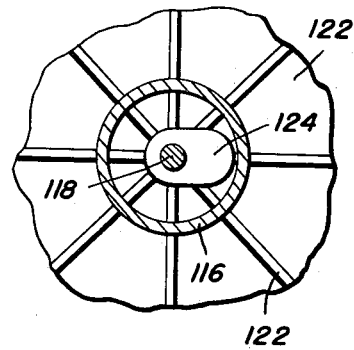
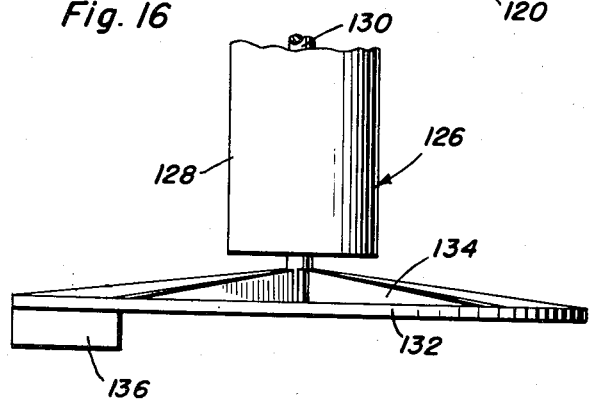
Charles P. deBiasi
INVENTOR.

United States Patent Office 2,969,987
Patented Jan. 31, 1961

2,969,987

MATERIAL SPREADER FOR USE ON A DUMP TRUCK

Charles P. de Biasi, Braman Road, Waterford, Conn.

Filed July 16, 1957, Ser. No. 672,331

16 Claims. (Cl. 275—8)

The present invention generally relates to an attachment for the dump body of a truck for spreading material carried by the dump body by the use of a rotatable broadcasting disk.

An object of the present invention is to provide a material spreading attachment for the tailgate of a dump body in the form of a depending tubular member pivotally secured to the tailgate and having an adapter extending through an opening in the tailgate for receiving material from the body together with a rotatable disk at the bottom of the tubular member for broadcasting material radially outwardly therefrom.

Another object of the present invention is to provide a material spreader in accordance with the preceding object in which means is provided for adjusting the rate of discharge of the spreader thus rendering the device efficient for use in spreading relatively expensive material such as salt normally employed in the control of ice and snow on highways.

A further important object of the present invention is to provide a material spreader supported from the tailgate in such a manner that the spreader will normally be disposed in vertical position with the attachment being readily removable and the opening in the tailgate readily closed for permitting the dump body to be used in a conventional manner.

Yet another important feature of the present invention is to provide a material spreader in accordance with the preceding objects in which the broadcasting device is operated by a hydraulic motor supplied with pressure from a hydraulic pump normally found on some types of dump trucks with the vertical depending tubular member provided with radial fins extending from the power shaft for breaking up any lumps which may occur in the material.

Yet another important object of the present invention is to provide a material spreading device which is especially adapted for use in spreading sand, fertilizer, lime stone, cinders, salt and any other granular or pulverulent material.

Another important feature of the invention is to provide a material spreader which is extremely simple in construction, easy to attach and detach, efficient in operation, adaptable for use with various types of vehicles and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a schematic side elevational view of the attachment of the present invention mounted on the rear of the dump body of a dump truck;

Figure 2 is a longitudinal, sectional view taken substantially upon a plane passing through the longitudinal center of the material spreader with a portion of the device being broken away for showing the cylindrical construction of the depending member;

Figure 3 is a transverse, plan sectional view taken substantially upon a plane passing along section line 3—3 of Figure 2 illustrating details of construction of the spinner disk together with the radial vanes mounted on the shaft for breaking any lumps which may occur in the material;

Figure 4 is a fragmentary enlarged side elevational view of the upper end of the depending tubular member and the manner in which it is attached to the tailgate of the dump body;

Figure 5 is a transverse plan sectional view taken substantially upon a plane passing along section line 5—5 of Figure 2 illustrating further structural details of the depending tubular member and its association with the opening in the tailgate of the dump body;

Figure 6 is a longitudinal, vertical sectional view taken substantially upon a plane passing along section line 6—6 of Figure 2 ilustrating further structural details of the material spreader;

Figure 7 is an exploded group perspective view showing the cover plate for the opening in the tailgate of the body;

Figure 8 is a fragmentary side elevational view illustrating a slightly modified form of the invention providing adjustment means for the rate of discharge of the material spreader;

Figure 9 is a side elevational view similar to Figure 8 with the sleeve in its uppermost position for varying the space between the spinner plate and the lower end of the tubular sleeve;

Figure 10 is a transverse, plan sectional view taken substantially upon a plane passing along section line 10—10 of Figure 8 illustrating the details of construction of this form of the invention;

Figure 11 is a transverse, vertical sectional view taken substantially upon a plane passing along section line 11—11 of Figure 10 illustrating further structural details of the present invention and showing the relationship of the depending tubular member and the adjustable sleeve of the lower end thereof;

Figure 12 is a sectional view illustrating a modified form of the invention in which a screw auger replaces the radial fins;

Figure 13 is a sectional view similar to Figure 12 illustrating another modified form of the invention in which a series of prongs is employed in lieu of the radial fins;

Figure 14 is a sectional view similar to Figure 12 showing another modified form of the invention in which the fins are eliminated and an eccentric weight is applied to the shaft for vibration thereof;

Figure 15 is a plan sectional view taken substantially upon a plane passing along section line 15—15 of Figure 14 illustrating the construction of the eccentric weight;

Figure 16 is a fragmental side elevational view illustrating another modified form of the invention in which an eccentric weight is mounted on the rotatable spreader plate.

Referring now specifically to the drawings, the numeral 10 generally designates the material spreader of the present invention for attachment to the dump body generally designated by the numeral 12 which is mounted on a usual truck frame 14 having ground engaging drive wheels 16 thereon along with a cab with various control elements (not shown). The dump truck is provided also with a fluid pump driven from the motor by any suitable means with the fluid pump being not shown since it is a conventional structural arrangement in dump trucks and especially those having hydraulically operated equipment associated therewith.

The dump body 12 is provided with a tailgate 18 which may be pivotal but for the purposes of the description of the present invention will be held stationary with the side walls thereof. The tailgate 18 is provided with an enlarged rectangular opening 20 defined by a pair of vertical angle iron members 22 having a rearwardly extending flange 24. Also, a top angle iron member 26 is provided with a rearwardly extending top flange 28. The rearwardly extending vertical flanges 24 on the angle iron members 22 are each provided with a longitudinal projection 30 which defines and forms an angulated slot or notch 32 therein for a purpose described hereinafter.

The attachment 10 includes a vertically disposed cylindrical member 34 with a substantially square upper adapter portion 36 disposed at the upper end of the cylindrical member 34. The adapter member 36 is provided with a pair of projecting pins 38 which are disposed in the slots 32 for permitting free swinging movement of the depending cylindrical or tubular member 34 about substantially a transverse horizontal axis which is generally in spaced parallel relation to the horizontal axis of tilting movement of the dump body 12 thus permitting the weight of the material spreader to maintain the tubular member 34 substantially in vertical position. The adapter 36 is provided with side walls 40 disposed closely adjacent the side edges of the opening and a curved bottom wall 42 interconnects the side walls 40 and is closely associated with the bottom of the dump body 12 as illustrated in Figure 2 with the bottom of the dump body 12 being designated by the numeral 44. The upper ends of the side walls 40 are interconnected by a curved top wall 46 which is closely associated with the upper edge of the opening 20 wherein the curved walls 42 and 46 not only form a seal for permitting entry of material into the cylindrical member 34 but also prevent disengagement of the pins 38 from the slots 32 such as may occur under violent bouncing such as when the vehicle is traversing irregular terrain.

The inner surface of the cylindrical depending member 34 coming into engagement with the rear end edge of the bottom 34 of the truck body 12 will limit the pivotal movement in this direction while the curvature of the top wall 46 is sufficient to engage the top edge of the opening 20 during the upward tilting movement of the dump body 12 in the normal unloading procedure. When it is desired to detach the material spreader, it is only necessary to raise the lower end thereof upwardly to dispose the tubular member 34 in substantially a horizontal position and then lift upwardly on the assembly thus disengaging the pins 38 from the notches or slots 32.

A supporting plate assembly 48 is disposed in the upper end of the adapter 36 and supports a vertically extending shaft 50 which extends therethrough and has a spur gear 52 on the upper end thereof for engagement with a drive gear 54 driven by a hydraulic motor 56 mounted on a suitable bracket 58 on the inner wall of the adapter 36 with the fluid motor 56 being connected to the conventional hydraulic pump on the dump truck by virtue of suitable fluid hydraulic lines (not shown) together with suitable control valves for operating the shaft 50. The shaft 50 is provided with a plurality of radial vanes or blades 60 which extend from the bottom of the tubular member 34 to the plate assembly 48 for drawing material over the bottom plate 42 and breaking up any lumps which may appear in the material before the lumps are discharged from the lower end of the tubular member 34. The lower end of the shaft 50 is provided with a rigid circular plate 62 having a plurality of radial vanes 64 on the upper surface thereof whereby the radial vanes will assure that any material falling onto the plate 62 will be discharged therefrom in all directions by the use of centrifugal force. When the spreader is not revolving, the material will take its natural angle of repose on the horizontal surface of the plate 62 thus preventing any further flow of material from the dump body.

When it is desired to use the truck for other purposes than spreading material, the spreader can be removed as set forth previously with the opening 20 being closed by a suitable removable plate 66 having inwardly extending peripheral flanges 68 with suitable fasteners (not shown) securing the flanges 68 to the angle irons for closing the opening 20.

Referring now specifically to Figures 8-11, a modified form of the invention is generally designated by the numeral 70 and this form of the invention includes a depending tubular member 72 equivalent to the tubular member 34 with the remainder of the structure being identical to the construction shown in Figure 2. Slidably and telescopically received over the lower end of the tubular member 72 is a cylindrical sleeve 74 encircling the lower end of the tubular member 72. The sleeve 74 is provided with a pair of diametrically opposed longitudinally extending hooks 76 for engagement with diametrically opposed sets of radially extending pins or pegs 78 which are disposed at progressively increasing distances from the lower end of the tubular member 72 whereby the vertical height of the sleeve 74 may be adjusted from the position shown in Figure 8 to a position shown in Figure 9. The lower end edge of the sleeve 74 is provided with a plurality of notches 80 for a purpose disclosed hereinafter. In this construction, the shaft 82 is provided with a spinner circular plate 84 having a plurality of upstanding radial vanes or ribs 86 thereon with the vanes terminating in vertical inner end edges 88 which will be disposed radially outwardly of the sleeve 74 as illustrated in Figure 11 whereby the sleeve 74 may be disposed immediately adjacent the upper surface of the plate 84 or remote therefrom thus varying the space between the plate 84 and the lower end of the tubular member formed by the sleeve 74 thereby varying the rate of discharge of materials from the material spreader. The notches 80 will permit the discharge of a limited amount of material which would be desirable when spreading materials such as salt. In the spreading of salt, it is desirable to spread a very thin coating since a very small amount is extremely effective and the cost of the material being spread is relatively high. Thus, by varying the space between the plate 84 and the lower end of the sleeve 74, the rate of discharge may be controlled. This rate of discharge may also be somewhat controlled by the speed of the driving of the hydraulic motor.

While the tubular members as well as the sleeve have been indicated as being cylindrical, it is pointed out that they could be square, rectangular or any other suitable shape for accomplishing the purposes desired.

Referring now specifically to Figure 12, a modified form of the invention is generally designated by the numeral 90 and this form of the invention includes the vertically disposed tubular member 92 equivalent to the tubular member 34 with the tubular member 92 being provided with a longitudinal shaft 94 disposed concentrically therein. The lower end of the shaft projects below the tubular member 92 and terminates in the circular spinner plate 96 having the upstanding radial vanes or ribs 98 thereon. The shaft 94 is provided with a spiral screw auger 100 thereon which extends between the shaft 94 and the tubular member 92 for assuring movement of the material vertically downwardly in the tubular member 92 and serves somewhat the same purpose as the radial vanes 60.

Referring now specifically to Figure 13, another modified form of the invention is generally designated by numeral 102 which also includes a vertically disposed tubular member 104 with the central longitudinal shaft 106 disposed therein with the shaft 106 terminating at its lower end below the tubular member 104 and having a circular spinner plate 108 attached thereto with the spinner plate 108 having the upstanding ribs 110 thereon. The shaft 106 is provided with a plurality of radially extending prongs 112 thereon which extend outwardly from the shaft 106 to a point adjacent the inner surface of the tubular member 104 for assuring downward movement of the material in the tubular member 104. The prongs 112 are longitudinally spaced on the shaft 106 and may be arranged in diametrically opposed pairs.

Referring now specifically to Figures 14 and 15, another modified form of the invention is designated by the numeral 114 and this form of the invention includes the depending tubular member 116 with the central longitudinal shaft 118 therein and depending below the tubular member 116 with the circular spinner plate 120 connected thereto and the ribs 122 are provided on the spinner plate 120. Secured to the shaft 118 is an offset or eccentric weight 124 which may be of any suitable magnitude and which may be located at any point along the vertical length of the shaft 118. With this weight 124, the material discharged through the tubular member 116 is vibrated during rotation of the shaft 118 thus assuring the discharge of the material. Of course, any number of weights 124 may be provided with the weights not being sufficiently large to impede the flow of material in the tubular member 116. Also an inherent unbalance may be constructed directly in the shaft 118.

Referring now specifically to Figure 16, the numeral 126 illustrates another modified form of the invention including a depending tubular member 128 with the shaft 130 thereon with the shaft having the spinner plate 132 on the lower end thereof and the spinner plate 132 is provided with the radial fins or ribs 134. Mounted on the undersurface of the spinner plate 132 is an offset weight 136 which may be of any magnitude and located at any eccentric point on the plate 132 for creating vibration as the plate rotates. It will be understood that any combination of unbalanced weights, vibration, prongs, tines, radial fins or spiral screw auger flights may be employed for accomplishing the discharge of the material downwardly in the tubular member from the truck body.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination with a dumpable body on a vehicle with the body having a tailgate with an aperture therein, a material spreading attachment, said aperture being defined by a rearwardly extending peripheral flange, said attachment comprising a depending tubular member freely pivotally suspended from the flange on the tailgate with the upper end thereof being received in the aperture whereby said tubular member is communicated with the interior of the body, rotatable broadcast means disposed below and supported from the tubular member for receiving material therefrom, and means disposed above the broadcast means for driving said broadcast means, the pivotal connection between the tubular member and the tailgate permitting the tubular member to be vertically disposed due to force of gravity during variations in the angle of inclination of the body.

2. The combination of claim 1 wherein means is provided on the lower end of the tubular member for varying the space between the lower end of the tubular member and the broadcast means for varying the rate of spreading.

3. The combination of claim 2 wherein said broadcast means includes a circular plate, a plurality of upstanding radial ribs on said plate whereby rotation of the plate will broadcast material deposited thereon from the tubular member in a radial direction by employing centrifugal force.

4. The combination of claim 3 wherein said means for driving said broadcast means includes a vertical shaft in said depending tubular member, said shaft being rigidly connected with the broadcast means, the upper end of said shaft terminating within the tubular member and being driven by a motor disposed within the depending tubular member.

5. The combination of claim 4 wherein said vertical shaft is provided with a plurality of longitudinally elongated fins for assisting in drawing the material into the depending tubular member and breaking up any lumps in the material.

6. In combination with a mobile pulverulent material carrying body capable of being dumped by tilting about substantially a horizontal axis, the wall of said body adjacent the horizontal axis of tilting thereof having an enlarged opening therein, a depending tubular member pivotally supported from said wall for free swinging movement about a horizontal axis in spaced parallel relation to the tilting axis of the body, said tubular member having means at the upper end thereof projecting into the opening for sealing the tubular member in relation to the wall, a vertical shaft supported in said tubular member, a rotatable plate mounted on the shaft and having upstanding radial ribs mounted on said plate and disposed below the lower end of the tubular member for broadcasting material radially outwardly, and means mounted within the upper end of the tubular member and drivingly connected to said shaft and assuring discharge of material onto the rotatable plate.

7. The combination of claim 6 wherein an adjustable sleeve is mounted on the lower end of said tubular member for varying the spacing between the plate and the sleeve for varying the rate of discharge from the sleeve onto the plate.

8. The combination of claim 7 wherein said sleeve is provided with a pair of upwardly extending hook-shaped members, said tubular member having a plurality of projecting pins arranged at various elevations for supporting the sleeve in various elevations in relation to said plate.

9. The combination of claim 8 wherein the lower end edge of said sleeve is provided with a plurality of notches for controlling the rate of flow of material onto the plate when the lower edge of the sleeve is disposed immediately adjacent to the upper surface of the plate.

10. The combination of claim 9 wherein the radial ribs on said plate terminal outwardly of the area defined by the sleeve thereby enabling the sleeve to be lowered to a point adjacent the upper surface of said plate.

11. The combination of claim 6 wherein said shaft is provided with a spiral screw auger conveyor flight mounted thereon for conveying material downwardly onto said rotatable plate.

12. The combination of claim 6 wherein said shaft is provided with a plurality of radially extending prongs extending throughout the length thereof for agitating the material in the tubular member for assuring its discharge onto the rotatable plate.

13. The combination of claim 6 wherein said shaft is provided with an eccentric weight mounted thereon for causing vibration of the tubular member during rotation of the plate for assuring discharge of material onto the rotatable plate.

14. In combination with a mobile pulverulent material carrying body capable of being dumped by tilting about substantially a horizontal axis, the wall of said body adjacent the horizontal axis of tilting thereof having an enlarged opening therein, a depending tubular member pivotally supported from said wall for free swinging movement about a horizontal axis in spaced parallel relation to the tilting axis of the body, said tubular member having means at the upper end thereof projecting into the opening for sealing the tubular member in relation to the wall, a vertical shaft supported in said tubular member, a rotatable plate mounted on the shaft and having upstanding radial ribs mounted on said plate and disposed below the lower end of the tubular member for broadcasting material radially outwardly, and means drivingly connected to the upper end of the shaft, said rotatable plate including an eccentric weight for vibrating the shaft and tubular member during rotation of the plate for assuring discharge of the material onto the rotatable plate.

15. An attachment for a mobile body for pulverulent material dumpable by tilting about a transverse horizontal axis and including a tailgate provided with an opening, said attachment comprising a depending tubular member, an adapter at the upper end of the tubular member, means on opposite sides of the adapter for pivotal engagement with the tailgate thereby providing free swinging movement of the tubular member about a transverse horizontal axis for maintaining the tubular member in vertical position during changes in angularity of the body, said adapter including side walls projecting into the opening and disposed closely adjacent the side edges thereof, an upper arcuate wall positioned adjacent the upper edge of the opening for sliding sealing relationship during relative angular movement between the body and adapter, the lower end of the adapter including a projecting arcuate lower wall positioned adjacent the lower edge of the opening for sliding sealing relationship during relative angular movement between the body and adapter, an elongated shaft disposed centrally within said tubular member, means on said tubular member for rotatably supporting the shaft, means connected with the shaft for rotating the same, said shaft extending below the tubular member, a circular plate fixed to the lower end of the shaft for rotation therewith and for receiving material from the tubular member, a plurality of radial fins on the upper surface of the circular plate for discharging material centrifugally therefrom, the pivotal connection between the adapter and body providing horizontal disposal of the circular plate during variations in the angular position of the body, and means operated by and supported from said shaft for assisting in the movement of the material through the tubular member.

16. The attachment as set forth in claim 15 wherein the side edges of the opening in the tailgate is defined by a pair of side flanges, each of said flanges having a notch therein, said means on opposite sides of the adapter including a pair of projecting pins removably received in the notches thereby removably supporting the attachment solely from the tailgate.

References Cited in the file of this patent
UNITED STATES PATENTS

| | | |
|---|---|---|
| 502,604 | Bollinger | Aug. 1, 1893 |
| 619,055 | Taylor | Feb. 7, 1899 |
| 699,004 | O'Neil | Apr. 29, 1902 |
| 1,171,960 | Kelly | Feb. 15, 1916 |
| 1,928,030 | Putnam | Sept. 26, 1933 |
| 2,049,998 | Elliott et al. | Aug. 4, 1936 |
| 2,332,903 | Downey | Oct. 26, 1943 |
| 2,418,546 | Comtois | Apr. 8, 1947 |
| 2,529,889 | Sullivan | Nov. 14, 1950 |
| 2,799,510 | Schmidt | July 16, 1957 |